Dec. 12, 1961 W. BRODBECK 3,012,454
MACHINE TOOL WITH INDEXING ROTATABLE WORK CARRIER HAVING
A PLURALITY OF WORKPIECE HOLDERS
Filed Sept. 4, 1958 2 Sheets-Sheet 1
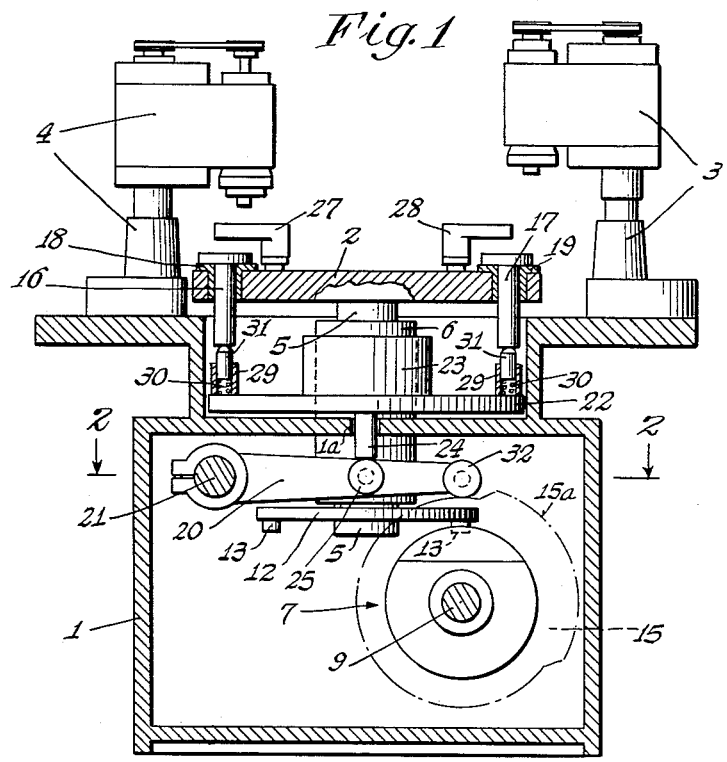
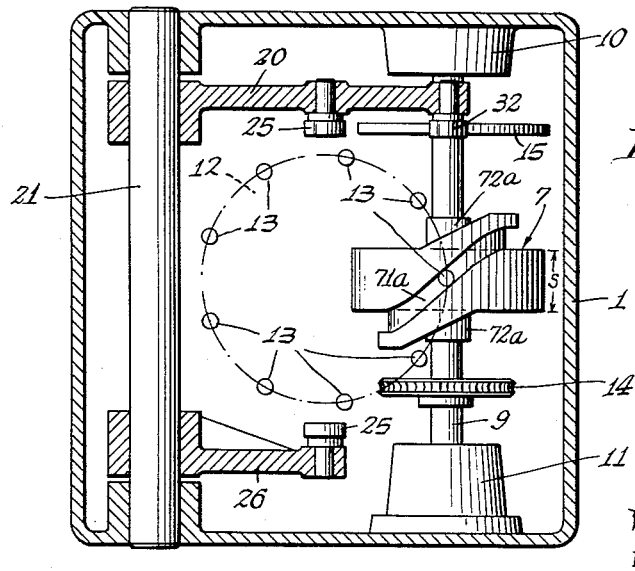
INVENTOR.
Willy Brodbeck
BY
Munn, Liddy, Daniels & March
ATTORNEYS

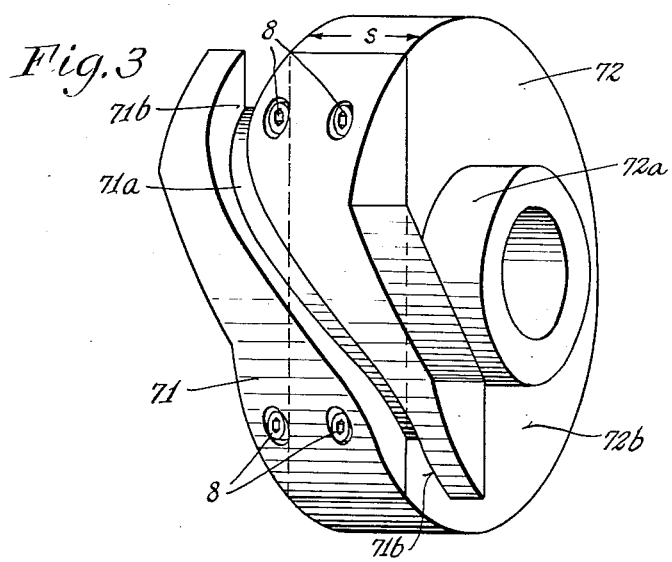
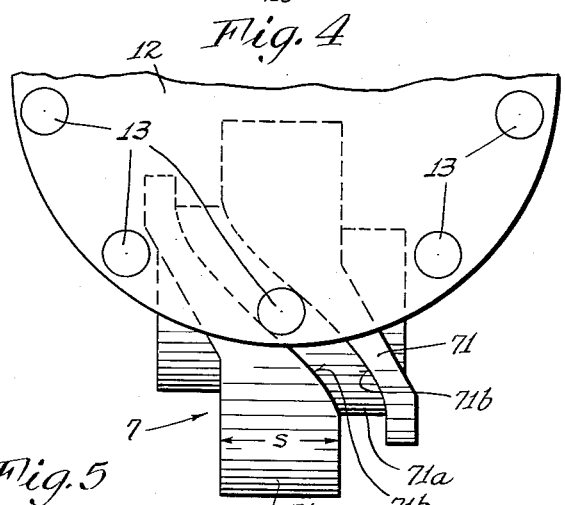
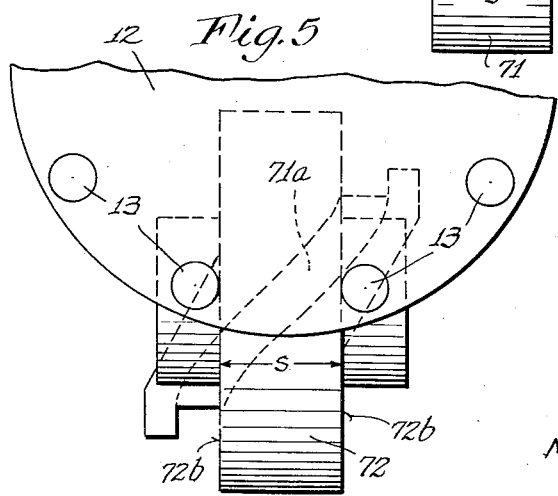
INVENTOR.
Willy Brodbeck

3,012,454
MACHINE TOOL WITH INDEXING ROTATABLE WORK CARRIER HAVING A PLURALITY OF WORKPIECE HOLDERS
Willy Brodbeck, Calmbach (Enz), Germany, assignor to Alfred Gauthier, G.m.b.H., Calmbach (Enz), Germany, a corporation of Germany
Filed Sept. 4, 1958, Ser. No. 758,961
Claims priority, application Germany Sept. 14, 1957
3 Claims. (Cl. 77—64)

This invention relates to machine tools, and more particularly to tools wherein an indexing rotatable carrier device is provided, having a plurality of workpiece holders by which workpieces may be successively brought to and held at work performing stations for the purpose of carrying out machining operations. Such rotatable carriers are arranged to be automatically indexed or periodically advanced so that they may be disposed and held in a number of different rotative positions, corresponding to the number of workpiece holders provided on the carriers.

Machine tools of this type are of advantage in enabling workpieces to be economically mass-produced in succession, that is, one after another. Various machines constructed to carry out such operations are well-known. However, these prior machines have a number of disadvantages or drawbacks, especially as regards the accuracy of the machining operations and also the cost involved in enabling the machines to produce precision work. For one thing, it is especially difficult to always precisely locate and securely hold the rotatable carrier which is indexed or advanced by steps, in its different rotative positions. Also, these machines have all required components of complicated shapes which were difficult to manufacture, thereby resulting in relatively great production costs. In spite of the complicated components involved and the relatively high expense involved in manufacture it has not been possible with well-known machines, particularly those employing Geneva movements for the purpose of indexing or advancing the rotatable workpiece carriers, to obtain sufficient accuracy and uniformity in the positioning of the said carrier whereby the machine could satisfactorily produce workpieces required as components for certain precision devices. Moreover, with well-known prior machines there is the added disadvantage that the time required for indexing the rotatable carrier, as in advancing it from one rotative position to the succeeding rotative position, represents a large percentage of the cycle time or time from the instant of completion of one workpiece to the instant of completion of the next or succeeding workpiece. Such appreciable non-productive, indexing time accordingly leaves less time for the actual machining operations, and the total time required only for the purpose of indexing the rotatable carrier until it makes one complete revolution is so large that the economy of the machine tool is considerably reduced.

An object of the present invention is to provide a novel and improved machine tool for the type having an indexing rotatable carrier provided with a plurality of workpiece holders, which obviates the above drawbacks and disadvantages of prior, well-known machines. A further object of the invention is to provide such an improved machine, which requires relatively simple and uncomplicated components of the type that may be economically fabricated, thereby avoiding high production costs and eliminating sources of error which in prior machine impairs the working accuracy thereof. Yet another object of the invention is to provide an improved machine tool in accordance with the foregoing, wherein the indexing rotatable carrier shall be accurately positioned at all times with great uniformity in its different rotative positions, so as to enable workpieces requiring the highest degree of precision to be repeatedly produced in accordance with critical tolerances and without machining difficulties. A still further object of the invention is to provide a machine tool as above characterized, where the time consumed in moving or indexing the rotatable carrier on which the workpiece holders are mounted shall represent a small percentage of the overall cycle time or time required as measured from the instant of completion of one workpiece to the instant of completion of the next or succeeding workpiece, thereby to enable the machine tool to carry out operations successively in accordance with minimum time standards or requirements.

In accordance with the present invention the above objects are accomplished by the provision in a machine tool of a novel indexing and locking structure characterized by a continuously turning rotary driving member carried by a drive shaft the axis of which is generally at right angles to the axis of the rotatable carrier on which the workpiece holders are mounted. Preferably the rotary driving member has a cam shoulder, as formed by one wall of a groove provided in the circumference of the member and extending for a predetermined distance around the circumference thereof, said cam groove and shoulder preferably having a sinusoidal shape or working surface. The said cam shoulder and groove are cooperable with cam followers, preferably provided in the form of pins arranged around the axis of the rotatable workpiece carrier and connected with the same to rotate therewith. The number of pins or cam followers may correspond to the number of workpiece holders mounted on the said rotatable carrier, and the followers may be mounted directly on the carrier or as illustrated herein on a separate member which is rigidly attached to the carrier. The portion of the circumference of the rotary driving member which is not taken by the said groove or cam shoulder is provided with spaced, oppositely facing locking shoulders adapted to simultaneously engage and lock against movement a pair of adjoining cam followers. The said spaced, oppositely facing locking shoulders may be conveniently and advantageously constituted as a segment of a cylinder with the axial length of the said cylinder, that is, the distance between the end faces of the cylinder, corresponding closely to the distance between any pair of adjoining cam followers.

By such construction of indexing and locking mechanism in a machine tool of the above type a number of important advantages are obtained, as compared with prior machine tools of this type. For one thing, the structure of the present improved machine is extremely simple and uncomplicated, and the coaction of the various individual components is simple and reliable. Moreover, relatively few components are required by the present structure. In consequence, the cost of fabrication of the required parts and components, to effect the desired indexing movement and accurate positioning of the rotatable workpiece carrier is extremely low, since the basic and essential components involve but a single control groove or cam shoulder on the rotary driving member, cooperating with relatively simple cam followers which may be in the nature of pins or studs.

Of special importance is the exact and precise positioning of the rotatable carrier, which mounts the workpiece holders, in its different rotative positions as provided by the indexing and control mechanism of the invention. Such desirable positioning of the rotatable workpiece carrier is made possible since the cam followers or pins disposed around the axis of the carrier may be very accurately positioned by well-known and easily carried out machining operations, and since the axial length of the cylindrical segment of the rotary driving member may be readily accurately held to very close tolerances by which it can be fitted between any pair of adjoining cam followers with no appreciable looseness or play. Any desirable values assigned to the dimensions between the adjoining cam followers, and the dimension between the opposite end faces of the cylindrical segment may be readily obtained with present-day machine equipment, without undue expense or labor. For example, the positioning of the set of cam follower pins involves merely the producing of a number of arcuately spaced bores along the circumference of a circle, and the producing of the cylindrical segment involves merely the machining of a pair of planar, parallel faces on opposite sides of the segment, spaced apart by a certain distance.

Because of the above construction the rotatable workpiece carrier may be accurately advanced to its different rotative positions and securely held without movement in said positions during the machining operations, and in consequence a machine tool constructed in accordance with the invention is able to satisfactorily meet the highest requirements of accuracy and uniformity, with extremely close tolerances in the performing of machining operations on workpieces one after another. Such accuracy and uniformity are also obtainable, being particularly important, where the rotary driving member and the member which carries the cam followers or pins are of relatively small diameter. In consequence, there is possible a desirable compactness and saving in space, as compared with machines heretofore constructed.

Also of importance is the fact that the rotary driving member may be carried by the main control shaft of the machine, since this insures an accurate and reliable coordination between the rotatable workpiece carrier and the rotary driving member while at the same time enabling the structure to be compact and saving of space, and making possible the placing or indexing of the workpiece carrier in a large number of different rotative positions. Heretofore, in machines wherein a Geneva movement is provided for the purpose of indexing the workpiece carrier or equivalent device, it is not possible to obtain all of the above mentioned advantages at one and the same time. With such prior machines, in order to obtain the same high accuracy as provided by the machine of the present invention, a relatively large space is necessary for the required gearing, or else if the problem of space is solved by the use of a transmission arrangement while still enabling the workpiece carrier to have a large number of different rotative positions the accuracy of the indexing movement and the positioning of the carrier in its different rotative positions is greatly impaired.

The structure as provided by the present invention has the further advantage that the time required to shift or advance the workpiece carrier need only be a small fractional part of the production time per unit workpiece; that is, only a small portion of a revolution of the rotary driving member need be consigned to the task of indexing or advancing the workpiece carrier. This leaves a relatively great time for effecting the machining operations on the workpieces, thereby enabling precision machining operations involving the highest quality of work, as for example reaming and thread cutting operations, to be carried out with adequate time available. Also, by properly designing or shaping the cam shoulder or groove which is provided on the rotary driving member, various different speed characteristics may be had for indexing the rotatable workpiece carrier, particularly a speed characteristic which both begins and ends with a speed value of zero. This function may be readily obtained by making the cam shoulder or groove of sinusoidal shape. With such a shape there is the advantage that a particularly soft or easy action and movement of the workpiece carrier is obtained, resulting in the highest possible accuracy in its positioning and eliminating to the maximum degree shocks or excessive working forces on the various components which interact with each other.

An advantageous maximum working accuracy together with enonomical fabrication of components making up the indexing and control system of the machine, in accordance with the invention, is realized by making the rotary driving member of two parts, one part carrying the cam shoulder or control groove while the other part constitutes a segment of a cylinder and has the spaced oppositely facing locking shoulders which are adapted to simultaneously engage the pair of adjoining cam followers.

By such construction there is the advantage that the two opposite end faces of the segment of the cylinder may be produced or machined in the easiest manner and with the maximum degree of accuracy, inasmuch as the said end faces may be either milled or ground so as to be perfectly true and parallel.

In order to easily adapt the indexing movement of the workpiece carrier to the machining operations on the workpiece in a reliable and advantageous manner the workpiece holders which are mounted on the rotatable carrier are made to be shiftable in opposite directions so that they may be advanced on and retracted from the cutting tools. A simple and effective control of the shifting movements of the workpiece holders may be had by the provision on the drive shaft which carries the rotary driving member of a radially acting control cam, in conjunction with cooperable cam follower means so arranged as to readily actuate the said shiftable workpiece holders.

It is possible by such organization to effect by a simple and compact means and using relatively few and simple components, an actuator or drive mechanism between the cam follower for the radially acting cam and the shiftable workpiece holders which has a reasonably high degree of efficiency. Such actuator or drive device, as provided by the invention, includes a shiftable lever which mounts the cam follower cooperating with the radial cam, the different angular positions of the lever being utilized to actuate the workpiece supports or holders, such actuation therefore being responsive to the angular position of the radially acting cam and of the drive shaft carrying the same. An actuator member in the form of a disc may be advantageously provided as a part of the said actuator or drive means, said disc being nonturnable but axially shiftable in response to the angular movement of the said lever. Spring-biased or equivalent connections may be established between the said actuator disc and the individual workpiece holders which are mounted on the rotatable carrier.

In carrying out the invention further, a high accuracy and uniformity in the machining of the workpieces is obtained by providing normally fixed, adjustable stops adapted to cooperate with the shiftable workpiece holders whereby the latter in being actuated by the spring-biased means are always brought to rest in exactly the same advanced positions, preparatory to the performing of the machining operations. The spring-biased means may be advantageously constituted as plungers, and flexible backing members for the plungers in the form of helical coil springs for example, may be provided.

An embodiment of the invention is illustrated in the figures.

FIGURE 1 is a schematic representation of an improved machine tool as provided by the invention, said tool being shown partially in elevation and partially in section, the latter being taken through the housing of the machine, there being shown a fully rotatable workpiece carrier or dial adapted to be advanced or indexed and held in different rotative positions.

FIG. 2 is a horizontal sectional view through the machine, taken on the line 2—2 of FIG. 1.

FIG. 3 is a perspective view of a rotary driving member as provided by the invention, having a control groove or cam shoulder for effecting the indexing of the rotatable workpiece carrier.

FIG. 4 is a diagrammatic representation of the rotary driving member and cam-follower means associated therewith, the parts being shown in the postions which they occupy during the indexing of the rotatable workpiece carrier.

FIG. 5 is a view similar to that of FIG. 4, but showing the parts in the positions which they occupy when the rotatable workpiece carrier is locked in a predetermined rotative position for the purpose of performing operations on a workpiece.

Referring to FIGS. 1 and 2, the improved machine tool of the present invention comprises a frame or housing 1 on which there is rotatably carried a dial or carrier member 2 adapted to carry workpieces in sequence or succession to one or several operation-performing stations. The rotatable carrier or dial 2 in its simplest form may constitute a circular disc, and adjoining the dial or carrier 2 there are provided cutting tool assemblies, designated 3 and 4, which may include driving motors coupled to spindles which have the usual chucks for mounting cutting tools and the like. While two tool assemblies 3 and 4 are shown, it will be understood that additional assemblies of this type may be provided in conjunction with the rotatable carrier 2. For the sake of clarity of illustration such additional assemblies are not shown in the figures. The tool spindles of such assemblies may carry various machining bits, such as drills, counterbores, taps, reamers or other turning tools, in accordance with the operations which are to be performed. The rotatable carrier 2 is mounted to turn about a vertical axis, by the provision of a suitable spindle 5 carried in a guide bushing or bearing 6.

In accordance with the present invention the workpiece carrier 2 is indexed or periodically advanced by means of a continuously turning rotary driving member which is carried on a drive shaft disposed preferably at right angles to the axis of the carrier 2 and spindle 5. On the circumference of the said rotary driving member there is provided a cam shoulder, as by the provision of a curved groove which is preferably of sinusoidal shape, said groove and cam shoulder extending for a predetermined distance around the circumference of the member. The cam shoulder and the groove which provides the same are adapted to cooperate with a plurality of cam followers, as in the form of pins, which may be mounted on the workpiece carrier 2 or, as shown in the illustrated embodiment of the invention, mounted on a separate carrier 12 which is fixedly secured to the workpiece carrier 2 to turn concurrently therewith. That is, the workpiece carrier 2 and the cam-follower carrier 12 may both be rigidly affixed to the spindle 5. Also, that portion of the circumference of the rotary driving member which is not occupied by the cam shoulder and groove is constituted as a segment of a cylinder the opposite ends of which are planar and parallel, and spaced apart a distance which is equal to the spacing between any pair of adjoining pins or cam followers.

In the FIGURES, the rotary driving member as provided by the invention is indicated by the numeral 7. The construction and operation of such driving member may be readily appreciated from an inspection of the perspective view shown by FIGURE 3. As mentioned above, the driving member 7 has a curved control groove 71a which extends for a predetermined distance around the circumference of the member, the curvature of the said groove being preferably sinusoidal. As seen in FIGS. 2, 3, 4 and 5, the remaining portion of the circumference of the rotary driving member 7 is in the form of a segment of a cylinder the end surfaces or faces of which are planar and perfectly parallel with each other and normal to the axis of the member.

As shown by FIG. 3, the rotary driving member 7 preferably is constituted of two main portions, by which it may be effectively produced in an advantageous manner, with great accuracy and relatively low cost. One piece or part, which is indicated by the numeral 71, carries the control groove 71a the walls of which, indicated at 71b, are adapted to constitute camming shoulders for engagement with the cam follower pins 13. The other part of the rotary driving member 7 is constituted as segment of a cylinder, being indicated by the numeral 72, said segment having end faces 72b which constitute spaced, oppositely facing locking shoulders adapted to simultaneously engage and lock against movement the various pairs of adjoining cam followers or pins 13, one pair at a time. For the purpose of supporting the rotary driving member 7, as on a shaft, the part 72 thereof is provided with a hub 72a, as shown. The two portions 71 and 72 of the driving member 7 may be secured together in assembled relation by means of four screws 8, as is clearly shown in FIG. 3.

By constituting the rotary driving member 7 of two separate parts, the fabrication of the grooved part 71 as well as the cylindrical segment 72 is greatly faciliated, each such part being readily manufactured with the highest accuracy; furthermore, when the member 7 is constituted of the two parts as illustrated there is a saving of a considerable amount of material, as compared with fabrication from a single block of material.

The rotary driving member 7 is carried on a drive shaft 9 which is preferably disposed at right angles to the axis of the spindle 5 which carries the workpiece dial 2. As seen in FIG. 2, the shaft 9 is mounted in bearing blocks 10 and 11 which are supported by the machine housing 1. Also, the spindle 5 for the workpiece carrier 2 has fixedly secured to it the carrier disc 12 on which the cam followers or pins 13 are mounted. The number of the said cam followers corresponds to the number of rotative positions to which the workpiece carrier 2 is to be advanced, and corresponds to the number of workpiece holders mounted on the said carrier.

In accordance with the present invention, the indexing or advancing movement of the workpiece carrier 2 from one rotative position to the next is effected by cooperation effective between the control groove 71a, specifically the cam shoulders 71b thereof, and the cam followers constituted by the pins 13. In FIGS. 4 and 5 the cooperable relationship of these components is clearly shown.

Referring to FIG. 4 it is seen that one of the pins or cam followers 13 is disposed in the control groove 71a, being engaged with the side faces 71b thereof, and that as the rotary driving member 7 is made to turn it will effect a stepped turning of the carrier disc 12 which mounts the cam followers, and effect in consequence the turning and advancing of the workpiece carrier 2 which is connected with the disc 12. Such turning and advancing movement of the workpiece carrier 2 is halted as soon as one planar end surface of the cylindrical segment 72 engages the adjoining cam follower or pin 13 which is advancing on the said end surface. Since the axial length of the segment 72, indicated in the figures by the letter "S" is exactly equal to the spacing or distance between two adjoining cam followers or pins 13, when the said one pin engages one planar end face 72b of the segment 72 the neighboring pin 13 will engage the opposite end face 72b of the segment. This engagement of the two pins 13 with the ends of the segment 72 will be continued as the rotary driving member continues to turn, and will cease upon reengagement of one of the pins 13 with the cam shoulder 71b of the control groove 71a. The simultaneous engagement of the two end faces of the segment 72 by the pins 13 will securely position the carrier disc 12 and consequently the workpiece carrier 2 against any movement, and the arrangement is such that the workpiece carrier is held in proper position to present the workpieces carried thereby at the operation-performing stations of the machine tool.

FIGURES 4 and 5 illustrate clearly the simplicity of the components and structure, as provided in accordance with the invention, by which the indexing and positioning of the workpiece carrier 2 of the machine tool is effected. An outstanding advantage of the applicant's construction as provided by the invention is that the workpiece carrier 2 may be indexed and very accurately positioned through the use of but relatively few parts, which may be fabricated at low cost, while at the same time highly accurate and uniform machining operations are possible on successive workpieces, resulting in a relatively high rate of production even where close tolerances are required. It will be understood that the sliding of the end faces 72b of the cylindrical segment 72 past the cam followers or pins 13 may be effected without any looseness or play by virtue of the high accuracy which it is possible to obtain in the positioning and dimensions of these cooperable parts. This absence of looseness and play depends on the axial length "S" of the cylindrical segment 72 being made to exactly equal the spacing between adjoining pins 13, in conjunction with accurate angular positioning of the said pins about the axis of the carrier disc 12. Both of these conditions may be readily effected without difficulty by modern machine shop equipment, whereby there is insured at all times an absence of looseness in the said cooperable parts, thus effecting a precise positioning of the workpiece carrier 2 in its various settings. In consequence, all workpieces which are machined on the carrier 2 will be characterized by the greatest accuracy and uniformity.

The control groove 71a may, of course, have different shapes in accordance with specific requirements. As already mentioned, in the illustrated embodiment of the invention, it is provided with a sinusoidal shape which has proved to be especially advantageous as determined by actual operation of the machine tool. With a control groove having such sinusoidal shape the indexing of the rotatable workpiece carrier 2 is characterized by a speed which builds up from zero and by a deceleration wherein it again gradually reaches zero speed. Thus, at the moment that the locking of the workpiece carrier 2 is effected it does not possess any appreciable speed or kinetic energy, so that the engagement of the two adjoining pins 13 with the opposite end faces with the cylindrical segment 72 is done without shock or appreciable force. This action is of the utmost importance in maintaining the working accuracy of the machine tool, especially where the finest operations are to be performed on the workpieces.

As is evident from the figures, particularly FIG. 3, the control groove 71a need occupy only a small fractional part of the entire circumference of the rotary driving member 7; in the illustrated embodiment of the invention the control groove 71a is seen to cover about one fourth of the said circumference. This results in a further advantage as provided by the invention, in that the time required for indexing or shifting the workpiece carrier 2 constitutes only a small fraction of the entire time interval between the instants of completion of any two successive workpieces. Such arrangement provides for a relatively long time in which the machining operations may be carried out, and this is of special importance where finishing operations such as reaming, threading or the like are to be performed. Thus, for example, a reaming tool may be applied at a relatively slow rate of feed, thereby providing an accurate and smooth finish in the bore which is being reamed.

Further, in accordance with the invention, there is provided a radially acting control cam 15, which is mounted on the drive shaft 9 for the purpose of effecting a shifting of the workpiece holders with respect to the cutting tools. Referring to FIG. 2, the radially acting control cam 15 as well as the rotary driving member 7 may be both powered by the shaft 9, as by the provision of a driving pulley 14 coupled to a suitable source of power (not shown). The cam 15 may be utilized in an extremely simple manner to effect an advancing movement of the workpiece holders mounted on the carrier or dial 2, with respect to the cutting tools carried by the assemblages 3 and 4. In FIG. 1, two workpiece holders 16 and 17 are shown, said holders being shiftable vertically in the dial 2. As many workpiece holders may be provided on the dial as there are cam followers or pins 13 provided on the carrier disc 12, as will be readily understood. The workpiece holders 16, 17 may be provided with guide shanks passing through and bearing in guide bushings 18 and 19 which are fixedly mounted on the work carrier 2. The drive mechanism between the radially acting cam 15 and the workpiece holders 16 and 17 may advantageously include a lever 20 having a cam follower 32 arranged for engagement with the cam 15. The lever 20 may be carried on a supporting spindle 21 mounted on the housing 1 of the machine. This is clearly shown in FIGS. 1 and 2. The drive mechanism may further include an intermediary actuator member 22, which may be advantageously constituted as a disc, said member being secured against turning but being axially shiftable in vertical directions. The actuator member 32 may shift the workpiece holders 16 and 17 through yieldable driving connections which will be later described. As shown in FIG. 1, the actuator disk 22 is disposed above the lever 20 and is carried by a guide bushing 23 which has a bearing on the bushing 6. To hold the actuator member or disk 22 against turning, said member may be provided with depending pins 24 passing through bores in the machine housing 1, one of said pins 24 engaging an actuator roller 25 carried by the lever 20. In order to enable the machine tool to be compact as regards its vertical dimensions, and to enable the guide bushings 23 to have a relatively short length, there is provided a lever 26, carried by the shaft 21 and movable simultaneously with the lever 20. The lever 26 also carries a roller 27 for engagement with another pin 24 mounted on the actuator disk 22 at a point diametrically opposite the pin 24 shown in FIG. 1.

By providing the radially acting cam disk 15 on the drive shaft 9 which also mounts the rotary driving member 7 and which constitutes the main control shaft of the machine tool, there is the added advantage that both control elements and mechanisms associated therewith have a common actuator, thereby effecting the most precise and exact coordination of one mechanism with the other. In consequence, an especially reliable and effective synchronization of indexing movements and rest positions of the workpiece carrier 2 with the shifting movements of the workpiece holders 16, 17 is obtained. The rigid and unitary assemblage embracing the rotary driving member 7 and the radially acting cam 15, both carried by the same driving shaft 9, insures at all times a positive sequence wherein the vertical shifting movement of the workpiece holders 16, 17 follows the termination of the indexing or advancing movement of the rotatable carrier 2, and in consequence there is available for the machining operations the greatest time interval. Moreover, it is of particular advantage in conjunction with the novel and improved indexing and positioning mechanism as provided by the invention that the vertical shifting movement of the workpieces may be effected by means of a simple or plain disk constituted as a radially acting control cam. In prior machines of the instant general type the vertical shifting of the workpiece holders is effected by a complicated bell cam, in sharp contrast to the improved machine tool of the present invention, wherein the simple, radially acting cam 15 constitutes an important simplification which represents an appreciable economy of manufacture.

For the purpose of effecting the greatest possible accuracy in the machined workpieces, considering all aspects of the machining operations, there is provided by the invention as a further feature a plurality of normally fixed, adjustably mounted stops, preferably carried by the rotatable workpiece carrier 2, which stops are cooperable with the vertically shiftable workpiece holders 16, 17 in conjunction with yieldable actuating means for the said workpiece holders; such yieldable actuator means preferably is provided between the shiftable lever 20 and the vertically movable workpiece holders 16, 17. Referring to FIG. 1, the said fixed, adjustably positionable stops which limit the upward shifting movement of the workpiece holders 16, 17 are indicated by the numbers 27, 28 respectively. By means of a well-known setting or adjusting device which is not shown for reasons of clarity of illustration, the stops 27, 28 may be accurately and minutely adjusted in a vertical direction to closely determine and limit the upward stroke of the workpiece holders.

For the purpose of effecting a yieldable driving connection between the lever 20 and the workpiece supports 16 and 17 I provide on the actuator member or disk 22 vertical guide bushings 29, said guide bushings being equal in number to the cam followers 13 on the carrier disk 12 and the workpiece holders 16, 17 on the rotatable carrier member 2. Also, the guide bushings 29 have the same angular disposition as the said cam followers and workpiece holders. Slidable in the bushings 29 are pins or plungers 31 which are backed up by helical compression springs 30 so as to be continually held in normal, raised positions when not loaded by appreciable force from the workpiece holders. As shown in FIG. 1, the plungers 31 engage the lower extremities of the shanks of the workpiece holders 16, 17, and the springs 30 are sufficiently strong to support the weights of the workpiece holders and the workpieces carried thereby without appreciable compression. Only when the actuator member 22 is raised to cause the workpiece holders 16, 17 to engage the fixed stops 28 and 29 are the springs 30 compressed, and the extent of compression is determined by the amount of upward movement of the actuator member 22 which takes place after the workpiece holders 16, 17 have been halted by the said fixed stops.

By the above organization wherein the fixed stops accurately position the workpiece holders, and wherein the yieldable springs 30 strongly urge the said workpiece holders upward against the fixed stops in response to actuation of the lever 20 by the cam 15 there is insured at all times an exact vertical positioning of the holders, thus enabling extremely accurate machining operations to be performed on the workpieces. Thus, as effected by the improved indexing and positioning structure provided by the invention there is had at all times an accurate and precise angular positioning of the rotatable carrier 2 as well as a precise vertical positioning of the workpiece holders 16, 17, resulting in the highest degree of accuracy and quality of the workpieces being machined.

The vertical shifting and positioning mechanism as above described is of advantage not only with the machine tool shown in the illustrated embodiment of the invention, but such mechanism (where workpiece holders are shifted and engaged with fixed stops in conjunction with a yieldable actuator means provided between the workpiece supports and the actuating cam therefor) is of utmost importance and advantage in all machine tools where great stress is placed on the relative positioning of the workpieces and the cutting tools, and where before the machining operation the workpieces are to be shifted in directions toward the said tools.

In summarizing, the mode of operation of the present improved machine tool as shown by the illustrated embodiment of the invention is as follows:

Upon power being brought to the motive means which drives the pulley or wheel 14 on the shaft 9, the said drive shaft together with the rotary driving member 7 and the control cam 15 are made to continually rotate. As soon as the control groove 71a of the member 7 engages one of the cam follower pins 13, the workpiece carrier 2 is rotatably shifted from one rotative position (previously occupied) to a new rotative position. This new position is finally effected when two adjoining cam follower pins 13 are brought into close engagement with the opposite end faces of the cylindrical segment 72 of the rotary driving member 7. By this cooperation or engagement of the cylindrical segment 72 with the two adjoining cam follower pins 13, the workpiece carrier 2 is locked in its new angular position against all movement. At the start of such locking of the workpiece carrier 2, the raised portion or land 15a of the control cam 15 is brought into engagement with the cam follower 32 of the lever 20, shifting the said lever counterclockwise as viewed in FIG. 1. The counterclockwise shifting of the lever 20 effects the vertical stroke of the workpiece holders 16, 17 which stroke is terminated when the said holders engage the fixed stops 27, 28. As soon as the workpiece holders 16, 17 engage the said fixed stops, the machining operation effected by the cutting tools of the tool assemblies 3, 4 is begun.

By well-known control means which are not shown herein, the duration of the machining operation is correlated with the speed of rotation of the shaft 9. Before the rotary driving member 7 again frees the workpiece carrier 2 and indexes or advances the latter to its next rotative position, the machining operations are completed and the workpiece holders 16, 17 are returned to their lowered or retracted positions in consequence of clockwise turning of the lever 20 as permitted by the control cam 15. Now another one of the cam follower pins 13 is engaged in the groove 71a of the rotary driving member 7, thereby effecting another advance of the workpiece carrier 2 preparatory to the machining of a new set of workpieces.

It will now be understood that, in accordance with the foregoing, there is provided by the invention an improved machine tool of the type having a rotatable workpiece carrier adapted to be indexed or advanced through various rotative positions, said carrier being provided with a plurality of workpiece holders by which a number of workpieces may be sequentially machined. The said workpiece carrier as above provided is adapted to be secured in different angular positions the number of which correspond to the number of workpiece holders mounted on the carrier. The present improved machine tool is capable of performing work of the highest degree of accuracy and uniformity by virtue of the provision of the unique, simple and uncomplicated index and positioning means shown, involving relatively few, simple components which may be fabricated at low cost.

It is to be noted, in connection with the simple construction and low cost thereof, that the indexing of the rotatable carrier for the workpieces and the locking of the carrier in its different rotative positions is effected without the use of the conventional notched device, such as a Geneva movement, which is not only costly but also subject to error in its manufacture; instead, the indexing and accurate positioning of the rotatable carrier for the workpieces is effected by the use of relatively simple and inexpensive components which are extremely reliable and accurate in their operation. With such components as provided herein, the accuracy of the indexing and positioning of the rotatable carrier for the workpieces is dependent exclusively on two basic dimensions, involving essentially lengths or spacings which may be obtained by present day equipment without difficulty and produced with the highest degree of accuracy.

Thus, there is provided by the present invention a greatly simplified, low cost machine tool of the type having an indexing dial or workpiece carrier, which machine tool may be utilized for all types of production and particularly production wherein machining operations of the greatest accuracy and uniformity are required.

I claim:

1. In a machine tool, a rotatable carrier having a plurality of workpiece holders arranged about its axis; means for indexing said carrier, including a rotary driving member having a cam shoulder extending for a predetermined distance around its circumference and including a plurality of cam followers arranged around an axis and connected with said carrier to rotate therewith, said cam followers being adapted to engage and be driven by said cam shoulder, said driving member having a portion extending for another predetermined distance around its circumference and provided with spaced, oppositely facing locking shoulders adapted to simultaneously engage and lock against movement a pair of adjoining cam followers upon continued rotation of the driving member after one of said followers has been shifted by said cam shoulder to advance the rotatable carrier through an angular distance, said cam shoulder being engageable with and driving a succeeding cam follower after such simultaneous engagement and advance and as the driving member continues to rotate, thereby to alternately lock the rotatable carrier in various different angular positions and index the carrier between the said positions, said workpiece holders being movable on the rotatable carrier between extended and retracted positions; means including a radially acting cam turntable with said rotary driving member for periodically shifting the said workpiece holders to their extended positions during the times that the cam followers are engaged with the oppositely facing locking shoulders of the driving member, the said means for shifting the workpiece holders to their extended positions further including a lever having a cam follower engageable with the said radially acting cam, and including an actuator member shiftable in response to movement of the said lever, said actuator member having biased means engageable with the workpiece holders to move the latter to extended position.

2. The invention as defined in claim 1, in which the rotary driving member is constituted of two individual pieces, one piece having a control groove one side wall of which constitutes the said cam shoulder, the other piece comprising a segment of a cylinder the opposite ends the which constitute the said spaced, oppositely facing locking shoulders.

3. In a machine tool, a rotatable carrier having a plurality of workpiece holders arranged about its axis; means for indexing said carrier, including a rotary driving member having a cam shoulder extending for a predetermined distance around its circumference and including a plurality of cam followers arranged around an axis and connected with said carrier to rotate therewith, said cam followers being adapted to engage and be driven by said cam shoulder, said driving member having a portion extending for another predetermined distance around its circumference and provided with spaced, oppositely facing locking shoulders adapted to simultaneously engage and lock against movement a pair of adjoining cam followers upon continued rotation of the driving member after one of said followers has been shifted by said cam shoulder to advance the rotatable carrier through an angular distance, said cam shoulder being engageable with and driving a succeeding cam follower after such simultaneous engagement and advance and as the driving member continues to rotate, thereby to alternately lock the rotatable carrier in various different angular positions and index the carrier between the said positions, said workpiece holders being movable on the rotatable carrier between extended and retracted postions; means including a radially acting cam turnable with said rotary driving member for periodically shifting the said workpiece holders to their extended positions during the times that the cam followers are engaged with the oppositely facing locking shoulders of the driving member, the said means for shifting the workpiece holders to their extended positions further including a lever having a cam follower engageable with the said radially acting cam and including an actuator member shiftable in response to movement of the said lever, said actuator member having biased means engageable with the workpiece holders to move the latter to extended position; and fixed adjustable stops adapted to be engaged by the workpiece holders when the latter are shifted to extended positions by the biased means, thereby to accurately limit the extent of movement of the workpiece holders, said biased means being engaged with resilient members to enable said means to exert continual pressure against the workpiece holders for all extended positions of the latter as determined by the said adjustable stops.

References Cited in the file of this patent

UNITED STATES PATENTS

| 141,548 | Elderfield | Aug. 5, 1873 |
| 163,738 | Carney | May 25, 1875 |
| 1,481,983 | Brightman | Jan. 29, 1924 |
| 2,380,314 | Kavle | July 10, 1945 |
| 2,857,787 | Natalis | Oct. 28, 1958 |